United States Patent
Miyata

(10) Patent No.: US 9,134,105 B2
(45) Date of Patent: Sep. 15, 2015

(54) CONTOUR SHAPE MEASUREMENT METHOD

(71) Applicant: CANON KABUSHIKI KAISHA, Tokyo (JP)

(72) Inventor: Akinori Miyata, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 107 days.

(21) Appl. No.: 14/094,631

(22) Filed: Dec. 2, 2013

(65) Prior Publication Data

US 2014/0157564 A1    Jun. 12, 2014

(30) Foreign Application Priority Data

Dec. 6, 2012 (JP) .................................. 2012-266909

(51) Int. Cl.
| | |
|---|---|
| *G01B 5/20* | (2006.01) |
| *G01B 5/00* | (2006.01) |
| *G01M 11/00* | (2006.01) |
| *G01B 21/04* | (2006.01) |

(52) U.S. Cl.
CPC ................ *G01B 5/20* (2013.01); *G01B 5/0021* (2013.01); *G01B 21/04* (2013.01); *G01M 11/30* (2013.01); *Y10T 29/49764* (2015.01)

(58) Field of Classification Search
CPC ........... G01B 7/02; G01B 5/0021; G01B 5/20
USPC .................................................... 33/553, 556
See application file for complete search history.

(56) References Cited

U.S. PATENT DOCUMENTS

| 4,265,022 A * | 5/1981 | Noguchi et al. ................ 33/553 |
| 4,731,934 A | 3/1988 | Barnaby et al. |
| 4,976,043 A * | 12/1990 | Bieg ................................ 33/551 |
| 8,567,084 B2 * | 10/2013 | Ogihara et al. ................ 33/553 |
| 2013/0024158 A1 | 1/2013 | Oshima |
| 2014/0157564 A1 * | 6/2014 | Miyata ........................... 33/556 |
| 2014/0190027 A1 * | 7/2014 | Abe ................................ 33/503 |
| 2014/0190028 A1 * | 7/2014 | Abe ................................ 33/503 |
| 2014/0283402 A1 * | 9/2014 | Hidaka et al. ................... 33/556 |

FOREIGN PATENT DOCUMENTS

| GB | 2 189 604 A | 10/1987 |
| JP | S54-105573 A | 8/1979 |

(Continued)

OTHER PUBLICATIONS

European Search Report dated Apr. 2, 2014 in related European Application No. GB1321211.3.

*Primary Examiner* — Yaritza Guadalupe-McCall
(74) *Attorney, Agent, or Firm* — Fitzpatrick, Cella, Harper & Scinto

(57) ABSTRACT

A contour shape measurement method that can more accurately align an article to be measured to a predetermined position to enable high-precision evaluation even in a state where a probe measurement axis and a table rotation axis do not match with sufficient precision is provided. A spatial position of the table rotation axis relative to the probe measurement axis is obtained as a rotation axis vector. Alignment data obtained in at least two directions is coordinate-transformed around the rotation axis vector, to constitute synthesized alignment data. The article is aligned based on the synthesized alignment data. Since three-dimensional data of a surface to be measured of the article can be calculated, the article can be directly aligned to the probe measurement axis.

8 Claims, 6 Drawing Sheets

(56) References Cited

FOREIGN PATENT DOCUMENTS

| JP | 62-272186 A | 11/1987 |
| JP | H06-300559 A | 10/1994 |
| JP | 8-29153 A | 2/1996 |
| JP | H08-29153 A | 2/1996 |
| JP | 2003-156405 A | 5/2003 |
| JP | 2009-14563 A | 1/2009 |

* cited by examiner

CONTOUR SHAPE MEASUREMENT METHOD

BACKGROUND OF THE INVENTION

1. Field of the Invention

The present invention relates to a contour shape measurement method for precisely measuring a shape of an optical element or a mold for manufacturing an optical element.

2. Description of the Related Art

A probe-type shape measurement device is widely used to measure a shape of a surface to be measured of an article to be measured such as an optical element or a mold. An example of the probe-type shape measurement device is a shape measurement device disclosed in Japanese Patent Application No. H08-29153. This shape measurement device measures the shape of the surface, by performing a scan with a probe along the shape of the surface and simultaneously obtaining oscillation information of the probe in chronological order. A line scanned with the probe on the surface is referred to as "scan line". With such a structure, the shape of the surface along the scan line is obtained as measured data.

Typically, a line intended to be measured on the surface is set according to the design shape of the surface. As an example, the line intended to be measured is a line suitable for evaluation by a performance evaluation tool such as an optical simulator. As another example, the line intended to be measured is a line suitable for a processing method by a processing machine to modify the optical element. Desired measured data is obtained by matching the scan line to the line intended to be measured. The measured data is then compared with the design shape of the line intended to be measured. The shape of the surface can be evaluated in this way.

As is clear from the above description, even in the case where the surface with the same shape is measured, the obtained measured data is different when the scan line is different. If the measured data and the design shape of the line intended to be measured are compared for evaluation in a state where the scan line does not match the line intended to be measured, the shape of the surface cannot be correctly recognized. That is, even when the surface is accurately shaped according to the design shape, the shape of the surface is incorrectly recognized as being different from the design shape. This is a measurement error. Such a measurement error needs to be reduced for high-precision measurement.

To precisely measure the shape of the surface using a contour shape measurement device in which the scan axis of the probe is uniaxial, the scan line needs to be matched to the line intended to be measured with sufficient precision. A necessary condition for this is to place the article at a predetermined position on the device. An operation of adjusting the article to the predetermined position on the device is referred to as "alignment".

The reference for aligning the article on the device can be mainly classified into the following two: one is the surface formed on the outside of the article; and the other is the surface to be measured of the article. In the case where how the shape of the surface to be measured is different from the design shape is intended to be evaluated, the surface to be measured is more desirably used as the reference.

As the method of aligning with respect to the surface to be measured, there is a method disclosed in Japanese Patent Application Laid-Open No. S62-272186. In this method, the article is placed on a rotation table and aligned to the rotation of the rotation table.

An article having an axisymmetric aspherical surface is used here as an example. The design shape of the axisymmetric aspherical surface is typically represented by a polynomial expression indicating the height direction with respect to the radial direction from the center to the periphery. Accordingly, to compare the measured data with the design shape represented by the polynomial expression, it is desirable that the line intended to be measured passes through the center of the surface to be measured and is in the radial direction, as in the form of expression of the design shape.

When processing an optical element having an axisymmetric aspherical surface, a method of processing the optical element by moving a processing tool in the radial direction according to a command while rotating the optical element around its center axis is used. The command in this case is the polynomial expression of the design shape or a polynomial expression generated by adding a correction amount to the design shape. The correction amount is usually generated from the measured data. It is therefore desirable that the line intended to be measured passes through the center of the surface to be measured and is in the radial direction, as in the processing method.

Here, the axis for scanning with the probe in the shape measurement device is referred to as "probe scan axis". When scanning with the probe along the probe scan axis, the probe oscillates according to the shape of the surface to be measured. Regarding this oscillating axis, an axis that intersects with the probe scan axis and is in the direction along the probe is specifically referred to as "probe measurement axis". Moreover, an axis of symmetry of the axisymmetric aspherical surface in the article is referred to as "article center axis". If the article is aligned so that the article center axis matches the probe measurement axis, the scan can be performed with the probe passing through the center of the surface to be measured in the radial direction.

In the conventional technique, the article is aligned to the rotation of the rotation table. That is, the article is aligned so that the article center axis matches the rotation axis (table rotation axis) of the rotation table. Japanese Patent Application Laid-Open No. S62-272186 describes that the probe measurement axis and the table rotation axis are substantially parallel. Hence, the article center axis indirectly matches the probe measurement axis.

However, under circumstances where higher precision is increasingly required of alignment as the precision of shape measurement increases, it has become difficult to regard the probe measurement axis and the table rotation axis as being substantially parallel. In the case of performing shape measurement with high precision, an axial misalignment between the probe measurement axis and the table rotation axis is not negligible. Even when the article is aligned using the conventional technique, it is difficult to ensure that the article center axis matches the probe measurement axis. In a state where the article center axis and the probe measurement axis do not match with sufficient precision, the scan line and the line intended to be measured do not match, and so high-precision measurement is impossible.

The present invention has an object of providing a contour shape measurement method that can more accurately align an article to be measured at a predetermined position to enable high-precision measurement even in a state where a probe measurement axis and a table rotation axis do not match with sufficient precision.

SUMMARY OF THE INVENTION

According to the present invention there is provided a contour shape measurement method according to claim 1. A further embodiment may provide a contour shape measurement method for measuring a contour shape of a surface to be measured wherein, after rotating the surface with respect to a probe to match a probe scan axis and a measurement direction of the surface, a scan is performed with the probe along the probe scan axis while moving the probe along the shape of the surface in a direction of a probe measurement axis to obtain measured data, the contour shape measurement method including: obtaining a spatial position of an axis for rotating the surface with respect to the probe, as a rotation axis vector relative to the probe measurement axis; obtaining alignment data which is the measured data in an alignment direction, in at least two directions; coordinate-transforming each set of alignment data around the rotation axis vector by a directional difference between a measurement direction and a corresponding alignment direction, and synthesizing the coordinate-transformed sets of alignment data to constitute synthesized alignment data; calculating a spatial position of the synthesized alignment data, by adapting the synthesized alignment data to a polynomial expression; calculating a difference between a spatial position of the surface and the spatial position of the synthesized alignment data where the probe scan axis passes through a predetermined part of the surface, as a setting error; moving an article to be measured, to a spatial position that reduces the setting error; and obtaining the measured data after moving the article.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
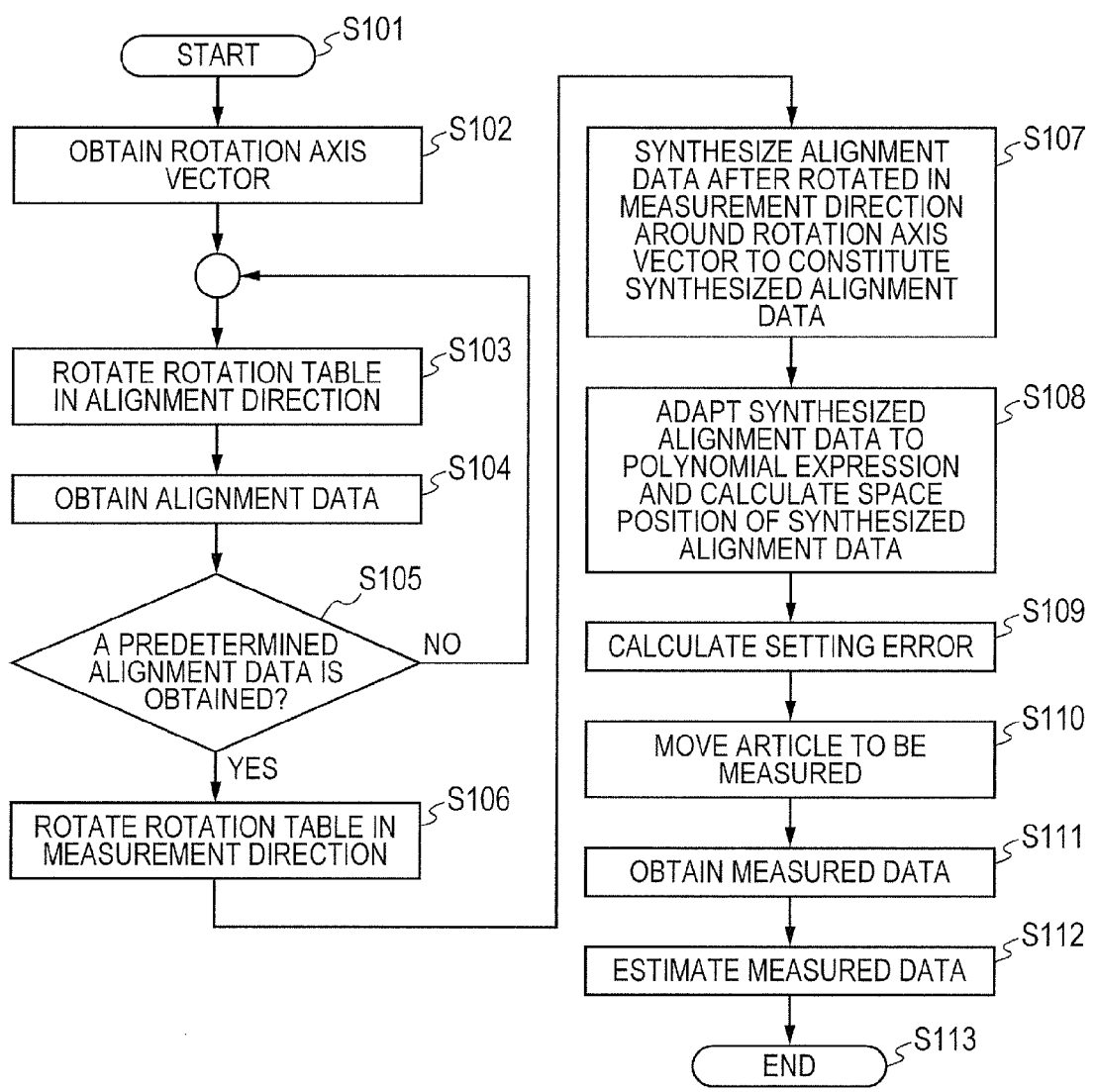
FIG. 1 is a flowchart of a contour shape measurement method according to Embodiment 1 of the present invention.
Figure 2:
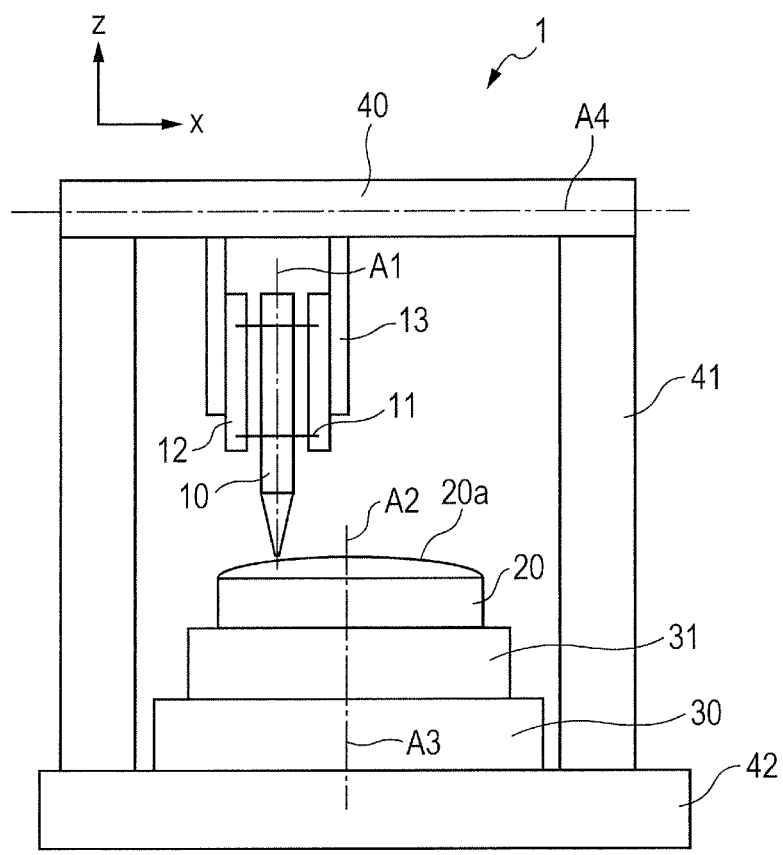
FIG. 2 is a diagram of a probe-type shape measurement device according to Embodiment 1 of the present invention.

FIG. 1 is a flowchart of a contour shape measurement method according to Embodiment 1 of the present invention. FIG. 2 is a diagram of a probe-type shape measurement device according to Embodiment 1 of the present invention.

A structure of a probe-type shape measurement device 1 according to Embodiment 1 of the present invention is described first, with reference to FIG. 2.

A probe 10 used for scanning along a surface 20a to be measured of an article 20 to be measured is supported by a housing 12 via flat springs 11. Two flat springs 11 are attached in parallel. By being attached in this way, the flat springs 11 function as a linear guide for moving the probe 10 in a uniaxial direction with respect to the housing 12.

The flat springs 11 also function as a spring element for generating a force according to the relative position of the probe 10 and the housing 12. Here, an air bearing or the like may be used as the linear guide function. Moreover, a magnetic spring using a magnetic force or the like may be used as the spring element function. Though the structure in which the probe is moved linearly is described here, a probe bent in the form of L may be used in such a manner that one end of the probe is in contact with the surface 20a and the probe is rotated around the other end. The housing 12 is attached to a Z stage 13. The housing 12 can be moved in the Z direction by driving the Z stage 13.

With regard to the relative position of the probe 10 and the housing 12, a position where the gravity acting on the probe 10 is balanced with the force generated by the flat springs 11 is specifically defined as "neutral position". When the housing 12 is pressed from the neutral position in a state where the probe 10 is in contact with the surface 20a, a force corresponding to the amount of press is applied to the probe 10. This force applied to the probe 10 is referred to as "contact force". In a stationary state, the same force as the contact force applied to the probe 10 is also applied to the surface 20a. The amount of press by which the housing 12 is pressed from the neutral position is referred to as "press amount". Even when the height of the surface 20a changes, by driving the Z stage 13 so as to make the press amount close to constant, the contact force applied to the probe 10 can be kept constant.

Since the Z stage 13 is driven so as to make the press amount close to constant, the relative position of the probe 10 and the housing 12 varies little. Hence, the movement axis of the probe 10 is regarded as matching the movement axis (Z direction) of the housing 12. In view of this, the position of the probe 10 in the Z direction can be measured by obtaining the press amount and the drive amount of the Z stage 13.

The press amount and the drive amount of the Z stage 13 can be obtained using a linear sensor. Various linear sensors are commercially available.

Another method of measuring the position of the probe 10 in the Z direction is a method in which a fixed reference plane is set in the device and the relative distance of the probe 10 from the fixed plane is measured by laser.

The Z stage 13 is attached to an X stage 40. The X stage 40 drives the Z stage 13 along a probe scan axis A4. This enables the scan with the probe 10 along the surface 20a. The movement axis (Z direction) of the probe 10 intersecting with a predetermined position on the probe scan axis A4 is referred to as "probe measurement axis A1". The probe scan axis A4 is set to be in a direction (X direction) orthogonal to the probe measurement axis A1 (Z direction). The drive amount of the X stage 40 is obtained using a linear sensor.

The drive amount of the X stage 40 also indicates the position of the probe 10 in the X direction. By combining this with the position in the Z direction, it is possible to obtain the position of the probe 10 on the XZ plane. As a result of obtaining the position of the probe 10 in chronological order while scanning with the probe 10 along the surface 20a, the contour shape when the surface 20a is cut along the XZ plane can be obtained.

There is a possibility that the probe measurement axis A1 and the probe scan axis A4 do not intersect at right angles. In such a case, the orthogonality of the two axes is calculated and corrected as an XZ value in an orthogonal state. As the method of calculating the orthogonality of the two axes, the following method is applicable. A high-precision standard that can be ideally regarded as a spherical surface is measured, and the orthogonality is calculated from the amount of deviation of the measured data from the spherical surface. Alternatively, the article to be measured is rotated to 0 degree and 180 degrees, and the same part is measured in the reciprocating direction. The orthogonality is calculated from the difference of the measured data obtained in the reciprocating direction.

The X stage 40 is attached to a base 42 via a support 41. A rotation table 30 is set on the base 42. An article alignment stage 31 is set on the rotation table 30. The article 20 is placed on the article alignment stage 31. For example, the article alignment stage 31 may have a structure in which an xyz stage and a biaxial inclination stage (θx and θy are variable) are overlapped. Though the article alignment stage 31 is not limited to the above-mentioned structure, the structure of the article alignment stage 31 needs to be such that the position and attitude of the article 20 can be changed relative to the rotation table 30 and as a result the position and attitude of the article 20 can be adjusted relative to the probe measurement axis A1.

The rotation table 30 is capable of rotating the article alignment stage 31 around a table rotation axis A3. The direction of the article 20 can be changed in this way. The direction at the time of measurement is specifically referred to as "measurement direction". Moreover, the direction at the time of obtaining below-mentioned alignment data is referred to as "alignment direction". The drive position of the rotation table is obtained using a rotary sensor.

Suppose the surface 20a of the article 20 is an axisymmetric aspherical surface. The axis calculated from the shape of the axisymmetric aspherical surface is defined as "article center axis A2".

A problem in the device structure is described below. First, several cases are assumed here. The first case is the case where the probe measurement axis A1 and the table rotation axis A3 match perfectly. In addition, assuming that the shape of the surface 20a is an ideal axisymmetric aspherical surface, the article center axis A2 is also assumed to perfectly match the probe measurement axis A1 and the table rotation axis A3. In such a state, the measured shape data is unchanged regardless of in which direction the contour shape of the surface 20a is measured by rotating the rotation table. That is, high-precision measurement is possible in any direction.

The second case is the case where an axial misalignment occurs between the probe measurement axis A1 and the table rotation axis A3. The axial misalignment mentioned here indicates a state where the two axes do not match, i.e. a state where the two axes do not intersect with each other but are in a skew relationship or a parallel relationship or a state where the two axes intersect only at one point. It is assumed that the article center axis A2 matches the probe measurement axis A1 in one direction. Suppose the rotation table is rotated to change the direction in this state. As a result, the article center axis A2 no longer matches the probe measurement axis A1. This means changing the direction causes different shape data to be measured. A measurement error thus occurs. To reduce the measurement error caused by changing the direction to nanometers, it is necessary to limit the axial misalignment in the translation direction to micrometers and limit the axial misalignment in the rotation direction to about 1/100. Manufacturing a device that satisfies such requirements, however, causes a significant increase in cost. It is very advantageous if high-precision measurement is possible while tolerating the state where an axial misalignment occurs between the probe measurement axis A1 and the table rotation axis A3. The second case mentioned above is the case addressed by the present invention.

The article alignment stage 31 can adjust the article 20 in two translation axes in the X and Y directions and two rotation axes of the X and Y axes.

Suppose the line intended to be measured passes through the article center axis A2 of the surface 20a and is in the radial direction. To match the scan line and the line intended to be measured, the article 20 is aligned so that the article center axis A2 matches the probe measurement axis A1 with sufficient precision.

The contour shape measurement method is described next, with reference to the flowchart illustrated in FIG. 1. The direction of the line intended to be measured is set to 0 degree as the reading of the rotation table. As the alignment direction, at least two directions are set. Though two directions of 0 degree and 90 degrees are used in this embodiment, other directions may be set, and two or more directions may be additionally set.

In S101, the measurement starts. In S102, the spatial position of the table rotation axis A3 is obtained as a rotation axis vector. The rotation axis vector (corresponding to A3) mentioned here is relative to the probe measurement axis A1, and is used for the below-mentioned process. In S103, the rotation table 30 is rotated in the alignment direction. In the case where the first alignment direction is 0 degree, the rotation table 30 is rotated in the direction in which the rotation angle of the rotation table 30 is 0 degree. In S104, the scan is performed with the probe along the surface to be measured, to obtain alignment data. The alignment data in the first direction is specifically referred to as "alignment data 1".

An aspherical standard that is provided beforehand with a reference shape which is an axisymmetric aspherical shape symmetrical with respect to the reference axis (A2) is used in S102. Here, after moving the reference axis (A2) so as to match the axis (A3) for rotating the surface to be measured, the measured data is obtained, and a valuated shape of a significant surface is adapted to the measured data to calculate the spatial position of the reference axis. The calculated spatial position of the reference axis is obtained as the rotation axis vector (corresponding to A3).

In S105, whether or not predetermined alignment data is obtained is determined. Since alignment data is to be obtained in two directions, "NO" is selected, and the procedure returns to S103. In S103, the rotation table 30 is rotated in the direction of 90 degrees as the reading of the rotation table 30. In S104, alignment data 2 is obtained as alignment data in the second direction. In S105, "YES" is selected as the alignment data in the two directions of 0 degree and 90 degrees are obtained. The procedure then proceeds to S106.

In S106, the rotation table is rotated in the measurement direction. Since the measurement direction is 0 degree, the rotation table 30 is rotated in the direction of 0 degree as the rotation angle of the rotation table. In S107, the alignment data is coordinate-transformed around the rotation axis vector by the direction difference from the measurement direction. Regarding the alignment data 1, the alignment direction and the measurement direction are both 0 degree, so that the direction difference is 0 degree. Accordingly, the alignment data 1 need not be coordinate-transformed. On the other hand, the alignment direction of the alignment data 2 is 90 degrees. Since the direction difference from the measurement direction of 0 degree is 90 degrees, the alignment data 2 is coordinate-transformed around the rotation axis vector by −90 degrees. The coordinate transform is calculated by multiplying the alignment data by a coordinate transform matrix. Following this, the alignment data 1, and the alignment data 2 coordinate-transformed around the rotation axis vector as shown above are synthesized to constitute synthesized alignment data. A process of combining array data of the alignment data 1 and the alignment data 2 to generate one set of alignment data is performed in the alignment data synthesis.

In S108, the synthesized alignment data is adapted to a function, to calculate a setting error. The function may be, for example, a polynomial expression. The polynomial expression includes a multivaluable polynomial expression and a trigonometric function polynomial expression. The polynomial expression is an expression obtained by multiplying the design shape of the surface to be measured or the result of partially changing the coefficients of the design shape, by the coordinate transform matrix. That is, the polynomial expression corresponds to the design shape of the surface to be measured or shape data generated by changing the design shape. The setting error is the difference between the position of the article at which the alignment is aimed and the position of the article in an initial state before the alignment. The position of the article at which the alignment is aimed is the position of the article where the scan line and the line intended to be measured match, as mentioned above.

The setting error is expressed as the spatial position of the article center axis A2 relative to the probe measurement axis A1. Thus, the setting error can be expressed as data corresponding to the difference in relative position and attitude between the probe measurement axis A1 and the article center axis A2. As the process of adapting the synthesized alignment data to the polynomial expression, for example, the following process is performed. The square root of sum of squares of the difference between the synthesized alignment data and the polynomial expression is set as an evaluation function. It is assumed that the synthesized alignment data is adapted to the polynomial expression better when the evaluation function is smaller. The polynomial expression includes the coordinate transform matrix, and changing the parameter of the coordinate transform matrix causes the evaluation function to change. Hence, optimization calculation by a steepest descent method is performed to calculate the parameter of the coordinate transform matrix that minimizes the evaluation function. That is, the parameter of the coordinate transform matrix represents the spatial position of the synthesized alignment data.

In S109, the setting error is calculated. In detail, the difference between the desired spatial position of the surface to be measured that is designated by the user and the spatial position of the synthesized alignment data is calculated as the setting error. In S110, the article to be measured is moved to such a position that reduces the setting error. In detail, the article is moved in the direction in which the probe measurement axis A1 and the article center axis A2 match, by driving the article alignment stage 31. In S111, the scan is performed with the probe along the probe scan axis A4, to obtain the measured data. In S112, the measured data is compared with the design shape of the line intended to be measured, and estimated. In S113, the measurement ends.

Figure 3:
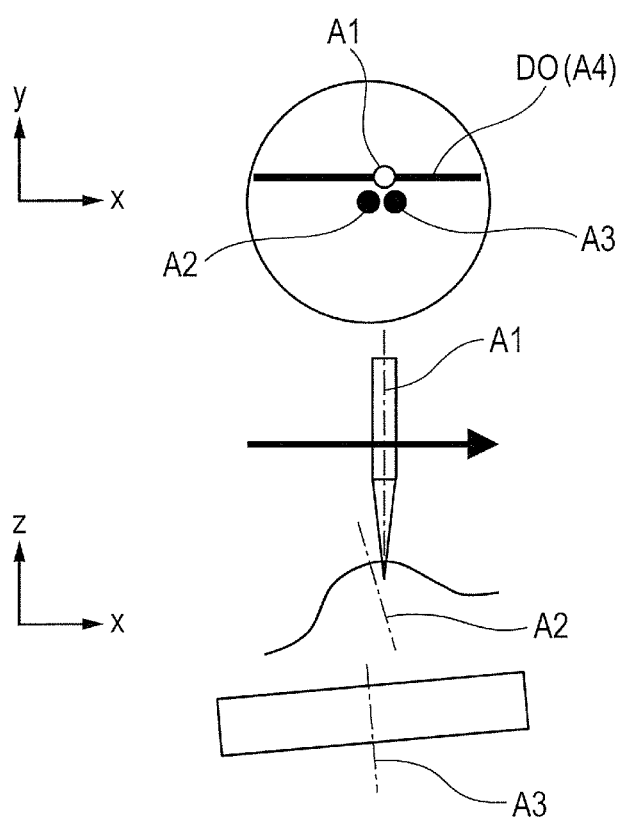
FIG. 3 is a diagram illustrating an initial state before alignment.

FIG. 3 is a diagram illustrating the initial state of the article to be measured, the probe, and the rotation table before the alignment. The spatial positions of the probe measurement axis A1, the article center axis A2, the table rotation axis A3, and the probe scan axis A4 are schematically illustrated on the XY plane and the XZ plane. An axial misalignment occurs between the probe measurement axis A1 and the table rotation axis A3, as mentioned above. In the initial state before the alignment, the article center axis A2 is also misaligned with both the probe measurement axis A1 and the table rotation axis A3. If the scan is performed with the probe along the probe scan axis A4 in this state, measured data of a scan line D0 is obtained. The scan line D0 does not match the line intended to be measured. It is therefore impossible to accurately evaluate the shape of the surface 20a to be measured in this state.

Figure 4:
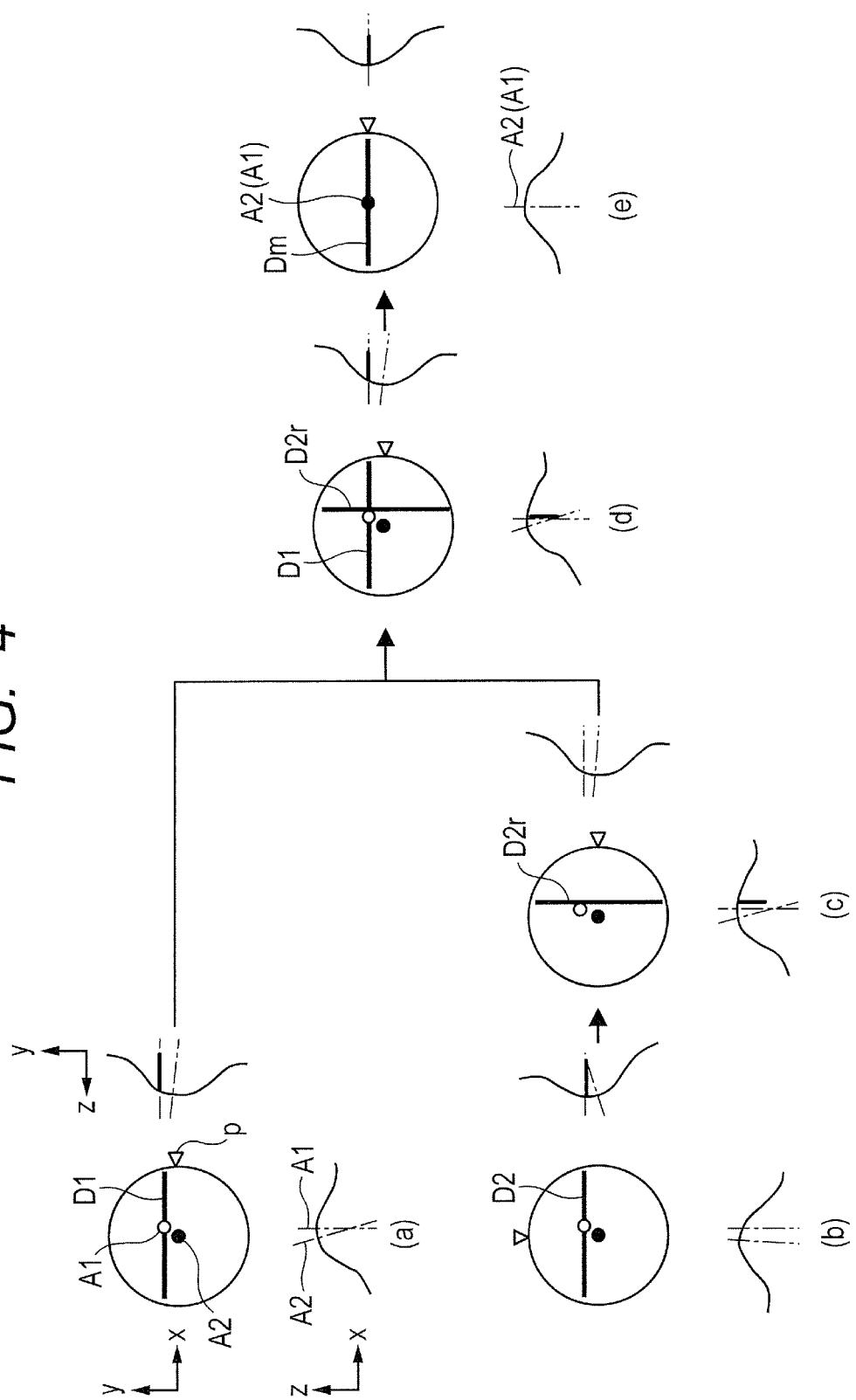
FIG. 4 is a state transition diagram of a surface to be measured according to Embodiment 1 of the present invention.

FIG. 4 is a state transition diagram of the surface to be measured according to Embodiment 1 of the present invention. (a) in FIG. 4 illustrates the state where the alignment direction is set to 0 degree. An axial misalignment occurs between the probe measurement axis A1 and the article center axis A2. A direction p is illustrated as a mark indicating the direction on the surface to be measured. The state where the direction p is in the X direction is set as a 0-degree direction. The alignment data 1 of a scan line D1 is obtained in the 0-degree direction. Since the measurement direction is also the 0-degree direction, the alignment data 1 need not be coordinate-transformed.

(b) in FIG. 4 illustrates the state where the alignment direction is set to 90 degrees. As a result of rotating the rotation table around the table rotation axis, the position of the direction p indicating the direction of the article to be measured on the surface to be measured is rotated counterclockwise by 90 degrees. Since the rotation table is rotated from 0 degree to 90 degrees around the table rotation axis, the state of axial misalignment between the probe measurement axis A1 and the article center axis A2 differs from the state in the 0-degree direction. The alignment data 2 of a scan line D2 is obtained in the 90-degree direction.

(c) in FIG. 4 illustrates the state where the alignment data 2 is coordinate-transformed around the rotation axis vector by −90 degrees. The position of the direction p has returned to the position of the 0-degree direction. (d) in FIG. 4 illustrates the state where the alignment data 1 and the alignment data 2 are synthesized. When the table rotation axis A3 matches the rotation axis in data processing, the article center axis A2 is situated at the same position in (a) and (c) in FIG. 4. That is, the virtual surface to be measured matches. By synthesizing the alignment data 1 and the alignment data 2, it is possible to obtain three-dimensional shape data of the surface to be measured. Once the three-dimensional shape data of the surface has been obtained, the three-dimensional shape data can be adapted to the polynomial expression to calculate the setting error.

The following describes the case of performing alignment by another method. For example, the alignment data is coordinate-transformed around the probe measurement axis by −90 degrees. When the alignment data is rotated in this way, the article center axis A2 is not situated at the same position in the step in (a) in FIG. 4 and the step in (c) in FIG. 4. In other words, the virtual surface to be measured is not uniquely determined. Accordingly, even when the alignment data 1 and the alignment data 2 are synthesized, it is impossible to obtain the accurate shape of the surface to be measured. If the accurate shape of the surface cannot be obtained, the accurate setting error cannot be calculated. Thus, to obtain the three-dimensional shape data of the surface to be measured, it is necessary to obtain the rotation axis vector and coordinate-transform the alignment data around the rotation axis vector. The method of obtaining the rotation axis vector will be described later.

The following describes the advantageous effect of calculating the synthesized alignment data and obtaining the three-dimensional shape data. The alignment data 1 and the alignment data 2 obtained in the structure of this embodiment are two-dimensional shape data on the XZ plane. With the two-dimensional shape data alone, it is normally impossible to recognize which part on the three-dimensional space of the surface to be measured the shape data corresponds to. Accordingly, when evaluating the two-dimensional shape data, there is a need to recognize beforehand which part on the surface to be measured the shape data corresponds to. This is as described above as the object to perform alignment.

In the case of three-dimensional shape data, on the other hand, which part on the three-dimensional space of the surface to be measured the shape data corresponds to can be determined by calculation. For example, the calculation process of adapting the shape data to the polynomial is performed as mentioned above. The spatial position where the shape data can be adapted to the polynomial best is calculated in this way. By regarding the calculated spatial position as the actual position of the surface to be measured, which part on the three-dimensional space of the surface to be measured the shape data corresponds to can be determined. This means there is no constraint that which part the scan line corresponds to needs to be determined beforehand, unlike the case of treating two-dimensional shape data. Actually, the shape data obtained in each step up to (d) in FIG. 4 is data during the alignment, and so which part of the surface to be measured each of the scan lines D1 and D2 (D2r) corresponds to is not known beforehand. According to the present invention, the accurate shape of the surface to be measured can be obtained as three-dimensional shape data, thus enabling the setting error to be calculated.

(e) in FIG. 4 illustrates the state after the alignment. Since the setting error can be calculated with the synthesized alignment data, the article alignment stage 31 is driven based on the setting error. In detail, the alignment is performed so that the article center axis A2 and the probe measurement axis A1 match.

Figure 5A:
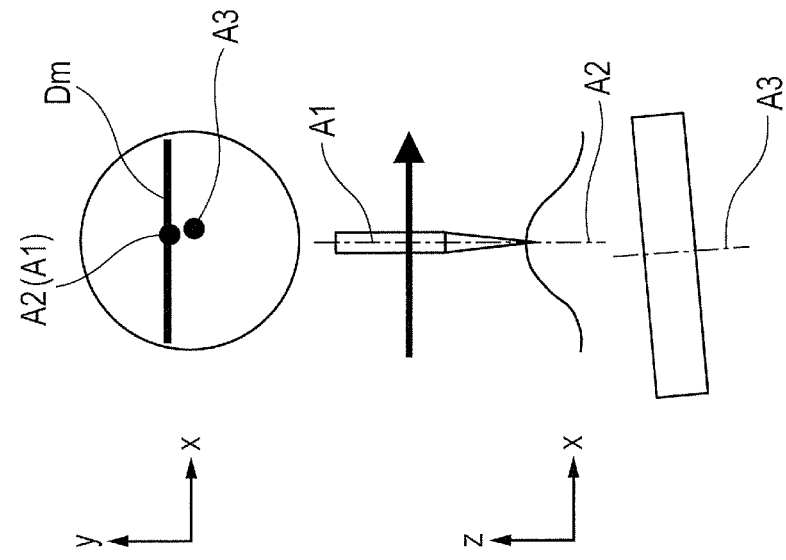
FIGS. 5A and 5B are diagrams for describing the effect according to the present invention.
Figure 5B:
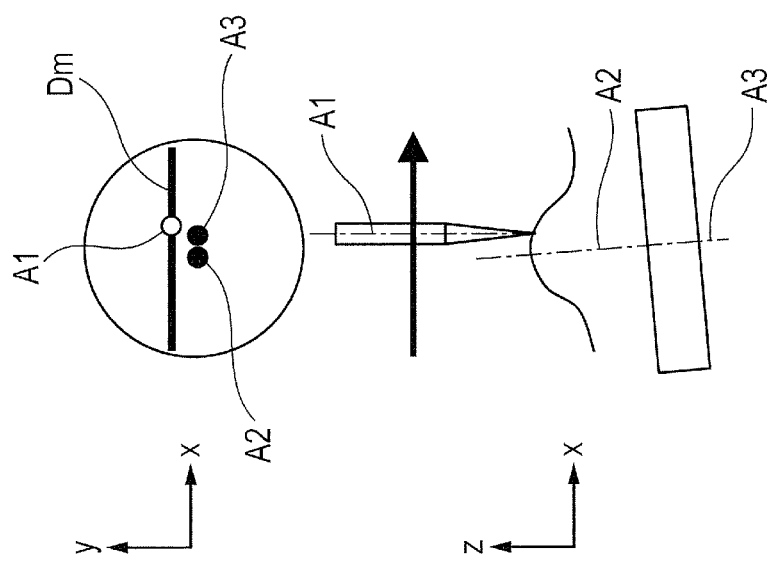

FIGS. 5A and 5B are diagrams for describing the advantageous effect according to the present invention. FIG. 5A illustrates the alignment state according to the conventional technique. In the conventional technique, the surface to be measured is aligned to the rotation of the rotation table. That is, the article center axis A2 and the table rotation axis A3 match. Meanwhile, the probe measurement axis A1 is misaligned with both the article center axis A2 and the table rotation axis A3. When the scan is performed with the probe along the probe scan axis A4 in this state, measured data of a scan line Dm is obtained. While the line intended to be measured passes through the center of the surface to be measured and is in the radial direction, the scan line does not apply to this.

FIG. 5B illustrates the alignment state according to this embodiment. The article center axis A2 and the probe measurement axis A1 match. Meanwhile, the table rotation axis A3 does not match any of the article center axis A2 and the probe measurement axis A1. The scan line Dm in this state passes through the center of the surface to be measured and is in the radial direction. Thus, the scan line and the line intended to be measured match, so that the shape of the surface to be measured can be evaluated more accurately than in the state where the scan line and the line intended to be measured do not match.

The method of obtaining the rotation axis vector (A3) is described below. Several methods are available as the method of obtaining the rotation axis vector. One is a method using an aspherical standard. The surface (standard surface) of the aspherical standard is shaped to be an axisymmetric aspherical surface, and the entire shape of the standard surface is valuated by another measurement device or the like. The aspherical standard is placed on the article alignment stage, in the same way as the article to be measured. The rotation table is rotated while contacting the standard surface with the probe. In this state, the article alignment stage is driven, and the position of the aspherical standard is adjusted so as to reduce the oscillation of the probe in the Z direction. If the oscillation is reduced, it can be determined that the center axis of the standard surface and the table rotation axis of the rotation table match. After this, the standard surface is scanned to obtain the shape data of the standard surface.

Figure 6:
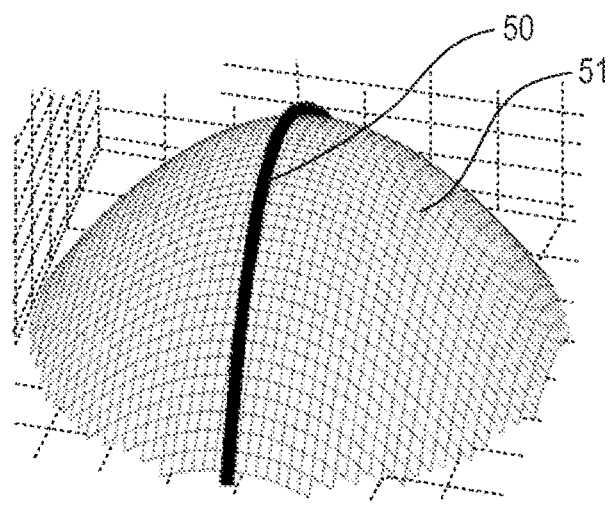
FIG. 6 is a diagram for describing a process of obtaining a rotation axis vector using an aspherical standard.

The scan line is determined by the relationship between the probe measurement axis and the table rotation axis, and so is unknown at this time. Meanwhile, the shape of the standard surface is known. Accordingly, the calculation process of adapting the shape data to the known shape of the standard surface is performed. FIG. 6 is a diagram for describing the process of obtaining the rotation axis vector using the aspherical standard, and indicates the result of the calculation process of adapting shape data 50 to a standard surface shape 51. Thus, since the shape is known, the state where the shape data 50 is adapted to the standard surface shape 51 best can be calculated even with two-dimensional data. This enables the three-dimensional position of the center axis of the standard surface to be calculated.

Since the calculation is based on the measured data, the center axis of the standard surface is obtained as the value relative to the probe measurement axis. Besides, the center axis of the standard surface matches the table rotation axis, as mentioned above. That is, the three-dimensional position of the probe measurement axis and the table rotation axis is obtained as data of the axis relative to the probe measurement axis. This data of the axis is defined as "rotation axis vector".

The rotation axis vector is expressed as one representative point $x1, y1, z1$ and axial inclination $\theta x1, \theta y1$. Alternatively, the rotation axis vector is expressed as two representative points $x1, y1, z1$ and $x2, y2, z2$.

Another method is a method using a columnar jig and an inclined jig. The columnar jig is shaped like a quadratic prism or a cylinder, and has a side surface as a reference surface. The inclined jig is formed so that a flat reference surface is inclined with respect to a ground contact surface. First, the columnar jig is placed on the rotation table so that the reference surface of the columnar jig is parallel to the table rotation axis. A displacement sensor capable of measuring the displacement of the reference surface of the columnar jig and the Z stage in the XY direction is attached to the Z stage. Inclination data of the reference surface of the columnar jig is obtained from the measurement of the displacement sensor when driving the Z stage in the Z direction, while rotating the rotation table. The columnar jig is removed, and the inclined jig is placed so that the reference surface of the inclined jig is at a specified inclination with the table rotation axis. The rotation table is rotated while contacting the reference surface with the probe. The probe oscillates at the amplitude according to the contact position and inclination of the reference surface. Representative point data on the rotation axis is calculated from the oscillation amplitude. The rotation axis vector is defined from the inclination data of the columnar jig and the representation point data of the inclined jig.

Alternatively, the rotation axis vector may be defined by obtaining two sets of representative point data using an inclined jig having two reference surfaces of different heights.

Yet another method is a method using a probe whose point of contact with the surface to be measured is offset in the Y direction. The use of such a probe enables measured data that is offset in the Y direction to be obtained, as a result of which three-dimensional measured data can be obtained and the rotation axis vector can be defined. As an alternative, a method using a probe capable of obtaining inclination information of the measurement surface is applicable, too.

The rotation axis vector can be obtained by any of the methods described above.

The method of setting the measurement direction is described below. In Embodiment 1, the direction in which the reading of the rotation table is 0 degree is set as the measurement direction. Likewise, the measurement direction may be set to a direction of the reading other than 0 degree. Alternatively, the measurement direction may be set based on the oscillation information of the probe, while rotating the rotation table in the state where the article to be measured is placed and the probe is in contact with the surface to be measured. For example, the area where the oscillation is highest and the area where the oscillation is lowest may be measured. The area where the oscillation is highest and the area where the oscillation is lowest can be considered as in the directions in which the non-axisymmetric error of the surface to be measured is significant.

The alignment direction is described below. The alignment direction is set in order to obtain the synthesized alignment data which is three-dimensional shape data. At least two directions are therefore necessary. In the case of obtaining the alignment data in two directions, it is particularly desirable that the two directions differ by 90 degrees. It is further desirable to use three or more directions, if a long time required for alignment can be tolerated.

Though this embodiment describes the article that has the axisymmetric aspherical surface, any article that has an axis defining the shape of the surface to be measured is equally applicable. For instance, a surface having an elliptic contour line with respect to the center axis can be measured by calculation while taking the direction of the surface into account.

Though the alignment is performed so that the article center axis matches the probe measurement axis, the alignment to other positions is equally applicable. For example, consider the case where the line intended to be measured is at a position offset from the article center axis by a predetermined distance. Even in such a case, so long as it is possible to match the article center axis and the probe measurement axis, the article only needs to be moved from that position by the designated distance.

(Article Manufacturing Method)

An article can be efficiently manufactured by executing: processing an article to be measured; and measuring a contour shape of a surface to be measured by the contour shape measurement method.

With the contour shape measurement method according to the present invention, the article center axis before the alignment can be calculated by constituting the synthesized alignment data representing the virtual three-dimensional shape of the surface to be measured. This allows the alignment to the position where the article center axis matches the probe measurement axis or to any other predetermined position. Thus, even in the state where the probe measurement axis and the table rotation axis do not match with sufficient precision, the article to be measured can be more accurately aligned to the predetermined position, to enable evaluation of measured data with high precision.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-266909, filed Dec. 6, 2012, which is hereby incorporated by reference herein in its entirety.

What is claimed is:

1. A contour shape measurement method for measuring a contour shape of a surface to be measured, by moving a probe with respect to the surface in a probe scan direction to obtain measured data of the surface, the contour shape measurement method comprising:

obtaining a spatial position of an axis for rotating the surface with respect to the probe, as a rotation axis vector relative to the probe measurement axis;

obtaining alignment data which is the measured data of the surface in at least two different alignment directions;

coordinate-transforming each set of alignment data around the rotation axis vector by a directional difference between a measurement direction and a corresponding alignment direction, and synthesizing the coordinate-transformed sets of alignment data to constitute synthesized alignment data;

calculating a spatial position of the synthesized alignment data, by adapting the synthesized alignment data to a function corresponding to a design shape of the surface or shape generated by changing the design shape;

calculating a difference between a spatial position of the surface in which the probe scan axis passes at a predetermined position of the surface and the spatial position of the synthesized alignment data, as a setting error;

moving an article to be measured, to a spatial position that reduces the setting error; and obtaining the measured data of the surface after moving the article.

2. The contour shape measurement method according to claim 1, wherein in the obtaining the rotation axis vector, after an aspherical standard, having a shape of a significant surface which is an aspherical shape symmetric with respect to a reference axis, that was valuated beforehand is moved so that the reference axis matches the axis for rotating the surface and the probe, the measured data is obtained and the valuated shape of the significant surface is adapted to the measured data to calculate a spatial position of the reference axis, and the calculated spatial position of the reference axis is set as the rotation axis vector.

3. The contour shape measurement method according to claim 1, wherein the surface to be measured has an axisymmetric aspherical surface.

4. The contour shape measurement method according to claim 1, wherein the surface to be measured has an elliptic contour line with respect to a center axis.

5. The contour shape measurement method according to claim 1, wherein alignment is performed so that a center axis of the article to be measured matches the probe measurement axis.

6. The contour shape measurement method according to claim 1, wherein alignment is performed with a center axis of the article to be measured being offset from the probe measurement axis by a predetermined distance.

7. A manufacturing method comprising:

processing an article to be measured; and measuring a contour shape of a surface to be measured by the contour shape measurement method according to claim 1.

8. A manufacturing method according to claim 7 wherein the article to be measured according to claim 7 is an optical element.

* * * * *